March 12, 1929.  A. H. ATZENHOFFER  1,704,998
WEATHER STRIP
Filed Dec. 27, 1927
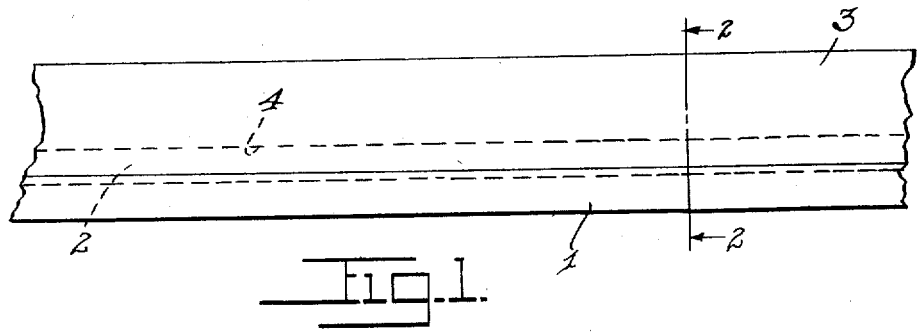
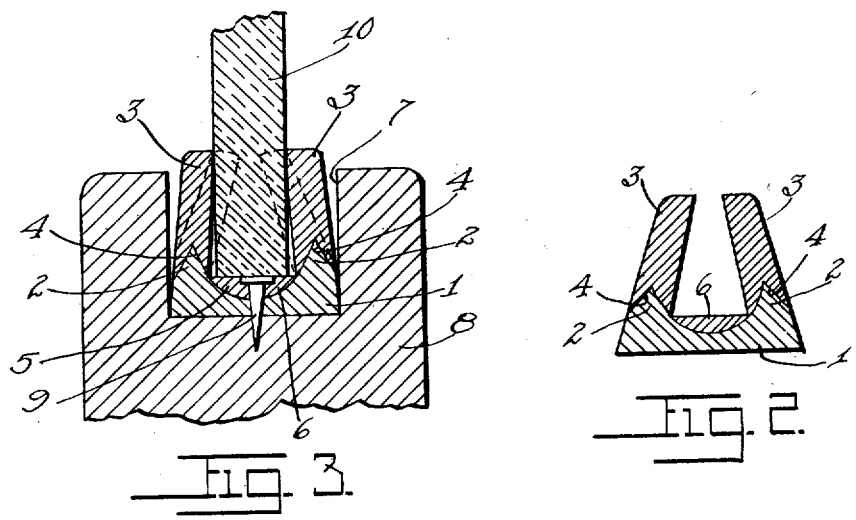
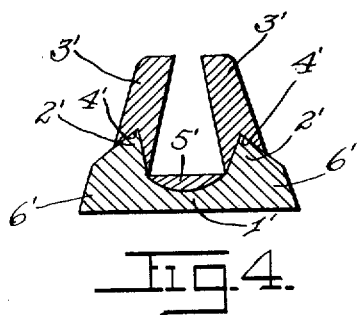
INVENTOR
A. H. ATZENHOFFER
BY
ATTORNEY Patented Mar. 12, 1929.

1,704,998

UNITED STATES PATENT OFFICE.

ARTHUR HERMAN ATZENHOFFER, OF CHICAGO, ILLINOIS.

WEATHER STRIP.

Application filed December 27, 1927. Serial No. 242,937.

My invention relates to improvements in weather strips, and it consists in the combinations, constructions, and arrangements herein described and claimed.

An object of my invention is to provide a weather strip which is specially adapted to be used on automobiles, but which may be used in any structure where a glass window or panel is movable with respect to a frame.

A further object of my invention is to provide a device of the type described in which a novel means is provided for forming an air-tight and weather-tight connection between the window and the frame.

A further object of my invention is to provide a device of the type described which has the general appearance of a one piece construction but which is formed of different compositions for producing the effective results.

A further object of my invention is to provide a device of the type described which has substantially frictionless portions positioned adjacent the window, whereby the window may be moved readily.

Other objects and advantages will appear in the following specification, and the novel features of the invention will be particularly pointed out in the appended claims.

My invention is illustrated in the accompanying drawings, forming part of this application, in which Figure 1 is a longitudinal side elevation of the preferred form of my device, Figure 2 is a section along the line 2—2 of Figure 1, Figure 3 is a horizontal sectional view of the strip as it appears when disposed in a frame and in connection with the window, and Figure 4 is a horizontal sectional view of a modified form of my device.

In carrying out my invention, I provide a weather strip which is constructed entirely of rubber compositions of different qualities and which are vulcanized together to form a substantially integral unit. In order to distinguish between the relatively soft rubber and the relatively hard rubber, I will first describe the soft rubber and then the hard rubber and let the distinction be made between the two descriptions. The soft rubber is a vulcanized rubber composition which, when pressed firmly against a window glass or other similar hard surface, will prevent the movement of the window glass with respect thereto in a comparatively free manner, while in contact therewith. The hard rubber is the converse of the soft rubber, in that, when held in the same manner, it will permit comparatively free movement of the window glass while in contact therewith, owing to its harder nature.

I provide a strip composed of a base 1 formed of soft rubber, as heretofore described. The base 1 is provided with tongue portions 2 for a purpose hereinafter described.

Side walls 3 are formed of the relatively hard rubber, as heretofore described, and are provided with grooves 4 for receiving the tongue portions 2 of the base 1. A connecting or contacting portion 5 is constructed of the above-mentioned relatively hard rubber. The portion 5, as will be noted, extends between the side walls 3 and is provided with a relatively thick portion 6 at its center.

From the foregoing description of the various parts of the device, the operation thereof may be readily understood. The process in which the various members of the strip are formed and vulcanized to each other is not herein considered. In Figure 3, I have shown the strip disposed in a recess 7 of a frame 8. The strip may be secured in place by nails or screws 9 which extend through the thickened portion 6 of the connecting portion 5, through the base 1, and into the frame. The connecting or contracting portion 5 serves a triple purpose in that it provides a substantially frictionless surface for the edge of a window 10; it reinforces the base 1, and it provides a means for positively securing the strip to the frame. If the nails or screws 9 projected only through the soft rubber base, the strip would not be as thoroughly secured in place. It will be noted that the sides 3 are forced out of their normal positions which are indicated in dotted lines in Figure 3 and the resiliency of the tongue portions 2 and the base 1 forces the side walls 3 into close engagement with the window 10, thus providing a weatherproof connection therebetween. It will be further observed that the side walls 3 engage with the window at their outer edges—thus decreasing the frictional contact between the window and the side walls of the strip.

In Figure 4, I have shown a modified form of my device which is provided with a soft rubber base 1' having lip portions 2' which are arranged to be disposed in the grooves 4' of the side walls 3'. A connecting portion 5' is provided and disposed in the base 1' between the side walls 3'. The outstanding difference between the form disclosed in Figure 4 and that disclosed in Figures 1 to 3, inclusive, is the reinforcing shoulders 6' of the base 1'. The advantage gained by the reinforcing shoulders 6' is that the resilient force of the base 1' is increased—thus more firmly holding the side walls 3' in engagement with a window, such as that disclosed at 10 in Figure 3.

I claim:

1. A device of the type described comprising a relatively soft rubber base, relatively hard rubber side walls secured to said base, and a relatively hard rubber connecting portion disposed between said side walls.

2. A device of the type described comprising a resilient base, longitudinally extending lip portions integral with said base, and substantially frictionless side walls having longitudinally extending groove portions arranged to receive said tongue portions and arranged to be secured thereto.

3. A device of the type described comprising a resilient base, longitudinally extending lip portions integral with said base, substantially frictionless side walls having longitudinally extending groove portions arranged to receive said tongue portions and arranged to be secured thereto, and a substantially frictionless member disposed between said side walls.

4. A device of the type described comprising a resilient base having enlarged shoulder portions and tongue portions, side walls formed of relatively hard rubber and provided with grooves arranged to receive the tongue portions of said base and to be secured thereto, and a relatively hard rubber connecting portion disposed between said side walls in said base.

Signed at Chicago, in the county of Cook and State of Illinios this 17th day of December A. D. 1927.

ARTHUR HERMAN ATZENHOFFER.

CERTIFICATE OF CORRECTION.

Patent No. 1,704,998.  Granted March 12, 1929, to

ARTHUR HERMAN ATZENHOFFER.

It is hereby certified that error appears in the printed specification of the above numbered patent requiring correction as follows: Page 1, lines 91 and 92, for the word "contracting" read "contacting"; and that the said Letters Patent should be read with this correction therein that the same may conform to the record of the case in the Patent Office.

Signed and sealed this 7th day of May, A. D. 1929.

(Seal)

M. J. Moore,
Acting Commissioner of Patents.

of my device which is provided with a soft rubber base 1' having lip portions 2' which are arranged to be disposed in the grooves 4' of the side walls 3'. A connecting portion 5' is provided and disposed in the base 1' between the side walls 3'. The outstanding difference between the form disclosed in Figure 4 and that disclosed in Figures 1 to 3, inclusive, is the reinforcing shoulders 6' of the base 1'. The advantage gained by the reinforcing shoulders 6' is that the resilient force of the base 1' is increased—thus more firmly holding the side walls 3' in engagement with a window, such as that disclosed at 10 in Figure 3.

I claim:

1. A device of the type described comprising a relatively soft rubber base, relatively hard rubber side walls secured to said base, and a relatively hard rubber connecting portion disposed between said side walls.

2. A device of the type described comprising a resilient base, longitudinally extending lip portions integral with said base, and substantially frictionless side walls having longitudinally extending groove portions arranged to receive said tongue portions and arranged to be secured thereto.

3. A device of the type described comprising a resilient base, longitudinally extending lip portions integral with said base, substantially frictionless side walls having longitudinally extending groove portions arranged to receive said tongue portions and arranged to be secured thereto, and a substantially frictionless member disposed between said side walls.

4. A device of the type described comprising a resilient base having enlarged shoulder portions and tongue portions, side walls formed of relatively hard rubber and provided with grooves arranged to receive the tongue portions of said base and to be secured thereto, and a relatively hard rubber connecting portion disposed between said side walls in said base.

Signed at Chicago, in the county of Cook and State of Illinios this 17th day of December A. D. 1927.

ARTHUR HERMAN ATZENHOFFER.

CERTIFICATE OF CORRECTION.

Patent No. 1,704,998.          Granted March 12, 1929, to

ARTHUR HERMAN ATZENHOFFER.

It is hereby certified that error appears in the printed specification of the above numbered patent requiring correction as follows: Page 1, lines 91 and 92, for the word "contracting" read "contacting"; and that the said Letters Patent should be read with this correction therein that the same may conform to the record of the case in the Patent Office.

Signed and sealed this 7th day of May, A. D. 1929.

(Seal)

M. J. Moore,
Acting Commissioner of Patents.